United States Patent [19]
Louwagie et al.

[11] Patent Number: 5,495,768
[45] Date of Patent: Mar. 5, 1996

[54] PRESSURE ISOLATOR ASSEMBLY FOR SANITARY PROCESSING

[75] Inventors: Bennett L. Louwagie, Plymouth; Steven M. Lemire, Chaska; Craig A. Everett, Minnetonka, all of Minn.

[73] Assignee: Rosemount Inc., Eden Prairie, Minn.

[21] Appl. No.: 277,710

[22] Filed: Jul. 20, 1994

Related U.S. Application Data

[63] Continuation of Ser. No. 52,161, Apr. 23, 1993, abandoned.

[51] Int. Cl.⁶ .................................................. G01L 7/00
[52] U.S. Cl. ................................................ 73/706; 73/756
[58] Field of Search ........................... 73/706, 716, 718, 73/719, 720, 721, 722, 723, 724, 725, 726, 727, 756

[56] References Cited

U.S. PATENT DOCUMENTS

| | | | |
|---|---|---|---|
| 4,046,010 | 9/1977 | Akeley | 73/406 |
| 4,072,058 | 2/1978 | Whitehead, Jr. | 73/720 |
| 4,109,535 | 8/1978 | Reed et al. | 73/706 |
| 4,541,282 | 9/1985 | Auerweck et al. | 73/715 |
| 4,768,382 | 9/1988 | Varrese | 73/715 |
| 4,787,250 | 11/1988 | Varrese | 73/715 |
| 4,924,701 | 5/1990 | Delatorre | 73/722 |
| 5,094,109 | 3/1992 | Dean et al. | 73/718 |
| 5,095,755 | 3/1992 | Peterson | 73/706 |
| 5,184,514 | 2/1993 | Cucci et al. | 73/706 |

FOREIGN PATENT DOCUMENTS

| | | | |
|---|---|---|---|
| 3121799A1 | 12/1982 | Germany | G01L 7/08 |
| 58060232 | 4/1993 | Japan | |

OTHER PUBLICATIONS

Diagram from Wika catalogue.
Article from Senpro catalogue. Feb. 1993.

Primary Examiner—Richard Chilcot
Assistant Examiner—William L. Oen
Attorney, Agent, or Firm—Westman, Chaplin & Kelly

[57] ABSTRACT

An isolator diaphragm is formed and connected to a support member so it will withstand periodic high pressure cleaning. Such periodic cleaning includes use of heated, concentrated cleaning solutions flowing under high pressure from a nozzle which moves rapidly over segments of an exposed surface of the isolator diaphragm. The present invention prevents isolator diaphragm failure precipitated by the substantially incompressible isolator fluid driven toward the perimeter of the diaphragm during cleaning operations. Such cleaning operations generate a separating force between the isolator diaphragm and diaphragm support. The isolator diaphragm has a peripheral wall portion bonded to a planar support surface and is formed to have an offset center region. The peripheral wall and center region are joined by a conical, inclined wall bounding the center portion. The support member has a correspondingly shaped recess with an inclined annular wall that supports the conical wall of the diaphragm. The primary diaphragm flexure point of the center portion of the diaphragm is moved away from the perimeter of the diaphragm, to adjacent the junction of the inclined wall and the center region. The bonding area is not subjected to a high separating force due to the movement in the incompressible fill fluid to a localized region of the diaphragm adjacent a seal or junction line.

9 Claims, 3 Drawing Sheets

5,495,768

PRESSURE ISOLATOR ASSEMBLY FOR SANITARY PROCESSING

This is a continuation of application Ser. No. 08/052,161, filed Apr. 23, 1993, now abandoned.

FIELD OF THE INVENTION

The present invention relates to a pressure sensitive assembly coupled to pressure measuring devices. In particular, the assembly receives and transmits applied pressure from sanitary process media in sanitary beverage or food processes through a fluid constrained by suitable tubing between the isolator assembly and a pressure transmitter.

BACKGROUND OF THE INVENTION

Known methods of sensing process media pressure utilize a thin isolator diaphragm coupled to a transducer disposed within a pressure transmitter housing. Where process conditions require remote measurement of process media characteristics, remote seals or isolator assemblies include flexible isolator diaphragms open to the process media that transmit pressure through an incompressible fluid which is carried in suitable capillary tubing connected from the remote isolator assembly to a sensor in a pressure transmitter. In the food and beverage processing industries, sanitary process conditions are required and fill fluid for the isolator diaphragm and tubing must not be harmful to humans. Thus, if a diaphragm ruptures no material harmful to humans contacts the process media. Of course, suitable fill fluid can be any of the fluids known as Generally Recognized As Safe by the U.S. Federal Department of Agriculture, CFR Title 21.

Pressure transmitters coupled to remote isolator diaphragms provide a reliable means of measuring process pressure while preventing the process medium from contacting the internal transmitter diaphragm. Accordingly, remote isolator diaphragms sense the pressure characteristics of corrosive process media; process media containing suspended solids; viscous process media; process media of extreme temperature; sanitary or aseptic process conditions; and media that must be flushed from lines and equipment between processing batches. Sanitary processing equipment often consists of a processing tank with isolator diaphragms interposed in the tank wall interior surface. Thus, the isolator diaphragm contacts the process media and transmits pressure signals to manually accessible pressure transmitters via suitable filled tubing.

In sanitary processing applications, where contamination of process media must be avoided, periodically intense sprays of cleaning solutions scour the process media containers, including the surfaces of the isolator diaphragms exposed to the media, at times resulting in failure of the isolator diaphragm. In use, the force of the moving spray impacts the exposed isolator diaphragm surface thereby driving the fill fluid toward the joint or seal between the diaphragm and a diaphragm support member. Such stress of the diaphragm seal joint may cause metal fatigue, and this condition appears more likely for sanitary isolator diaphragms than other diaphragm assemblies because most pressure-sensing applications involve a substantially equal pressure gradient over the entire surface of the flexible diaphragm. Thus, cleaning systems used in sanitary process industries tend to degrade isolator diaphragm performance and shorten the effective life of the diaphragm.

Automated cleaning systems, termed Clean-In-Place (CIP) systems, and manual cleaning systems used in sanitary processing both create similar degradation of isolator diaphragm assemblies. CIP and manual cleaning systems operate by directing streams of cleaning solutions from nozzles at elevated temperatures and pressures. The spray jets of CIP systems systematically move in cycles over the entire exposed processing surface in a controlled manner thereby inducing deformation of the isolator diaphragm. Such severe duty increases maintenance service requirements when using the prior art diaphragms.

SUMMARY OF THE INVENTION

The present invention comprises an isolator assembly with a sanitary seal that withstands periodic CIP procedures, including use of heated, concentrated, high pressure fluid streams directed against surfaces of the seal. The isolator assembly of the present invention utilizes a diaphragm member joined to a support member which has a bounding planar support surface at a first elevation around a recess and which support surface joins an annular inclined surface leading to the bottom surface of the recess. The bottom surface is at a second elevation. The bounding surface supports the diaphragm, which has a surface section that mates with and overlies the inclined surface. The diaphragm spans the recess in the support member to define a fluid cavity across the recess which is filled with a substantially non-compressible fluid. Pressure acting on the exposed surfaces of the diaphragm deflects the diaphragm about a primary diaphragm hinge point at the lower edge of the inclined surface and not where the diaphragm is joined to the support member at the bounding surface. Control of the edge configuration where the diaphragm is supported limits stress on the diaphragm seal as well as reducing diaphragm distortion and deformation, particularly when a concentrated stream of fluid under pressure impacts the exposed isolator diaphragm surface.

DESCRIPTION OF THE PREFERRED EMBODIMENTS

The elements illustrated in the accompanying figures are not drawn to scale but rather are exaggerated to highlight the salient features of the subject matter therein. Likewise, numerals denote similar elements contained in the figures for ease of reference.

Figure 1:
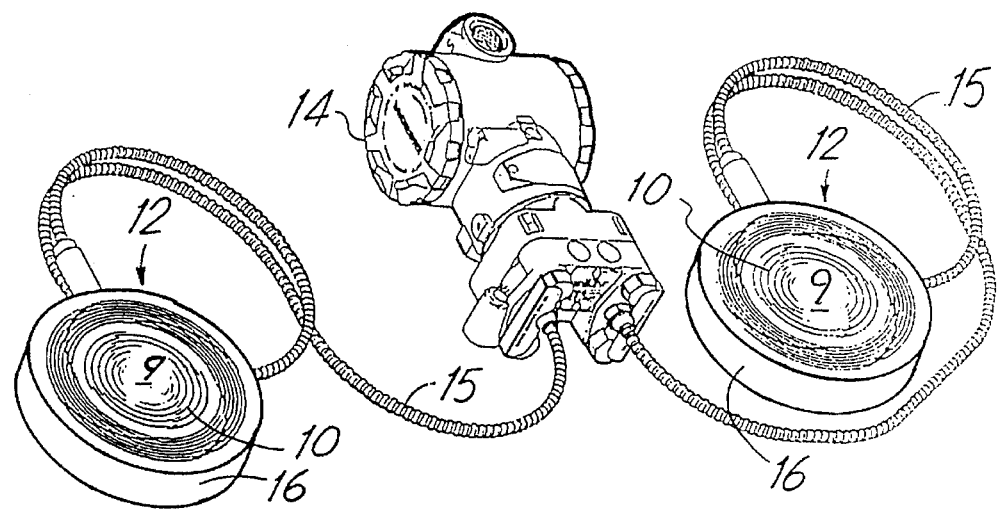
FIG. 1 is a reference three dimensional diagram showing two pancake-style remote isolator diaphragm assemblies attached to a conventional differential pressure transmitter.
Figure 2:
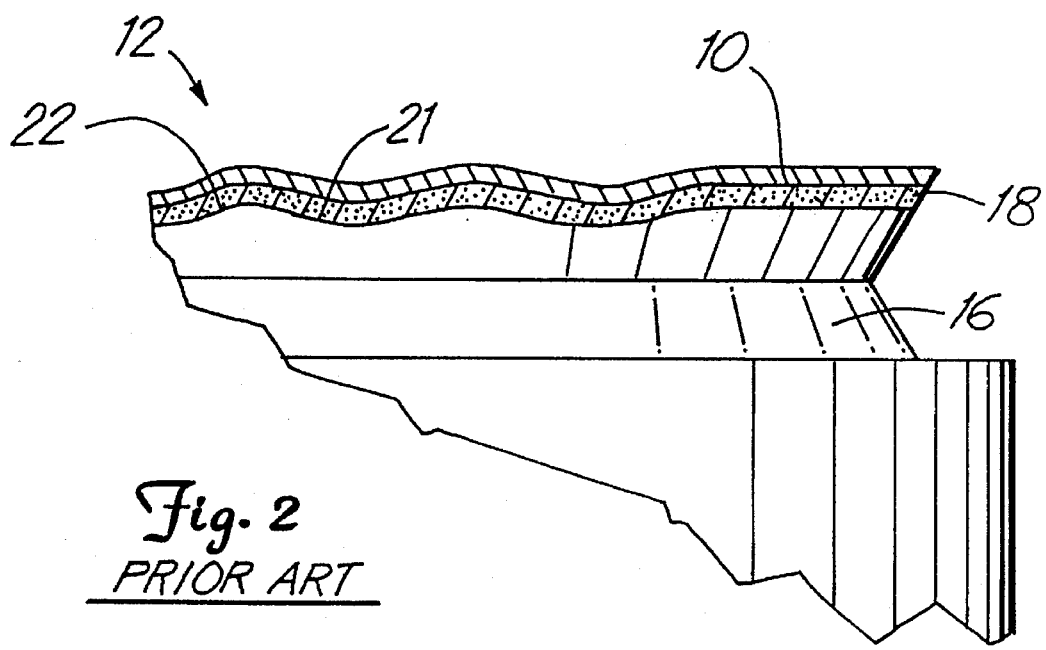
FIG. 2 is a partial sectional side view of a prior art remote isolator seal diaphragm assembly.

Referring now to the figures, FIG. 1 shows identical remote seal isolator assemblies 12 each having an exposed surface 9 of an isolator diaphragm 10 for sensing pressure. An outer peripheral edge of each diaphragm 10 seals on the edge of support member 16, forming a cavity 21 therebetween, as shown in FIG. 2. Fluid conduits 15 connect fluid-filled chambers formed by diaphragm 10 to a suitable pressure transmitter 14. The isolator pressure transmitter 14 may be directly coupled to the isolator assemblies 12 or remotely coupled with suitable tubing, as shown in FIG. 1. In both cases, displacement of the diaphragm 10 transmits pressure signals from the remote isolator diaphragm to a sensing diaphragm disposed within pressure transmitter 14 via movement of fill fluid that occupies the cavity between diaphragm 10 and its support member 16 and fills the conduits 15.

FIG. 2 illustrates a prior art remote seal isolator diaphragm 10, attached as at 18 along a seal line at the perimeter of a support 16 and located substantially in the same plane as the support member surface 22. In the embodiment shown, attachment seal line 18 comprises a conventional tungsten inert gas (TIG) weld that provides a fluid tight seal for the diaphragm 10 around the perimeter of fluid-filled cavity 21.

Figure 3:
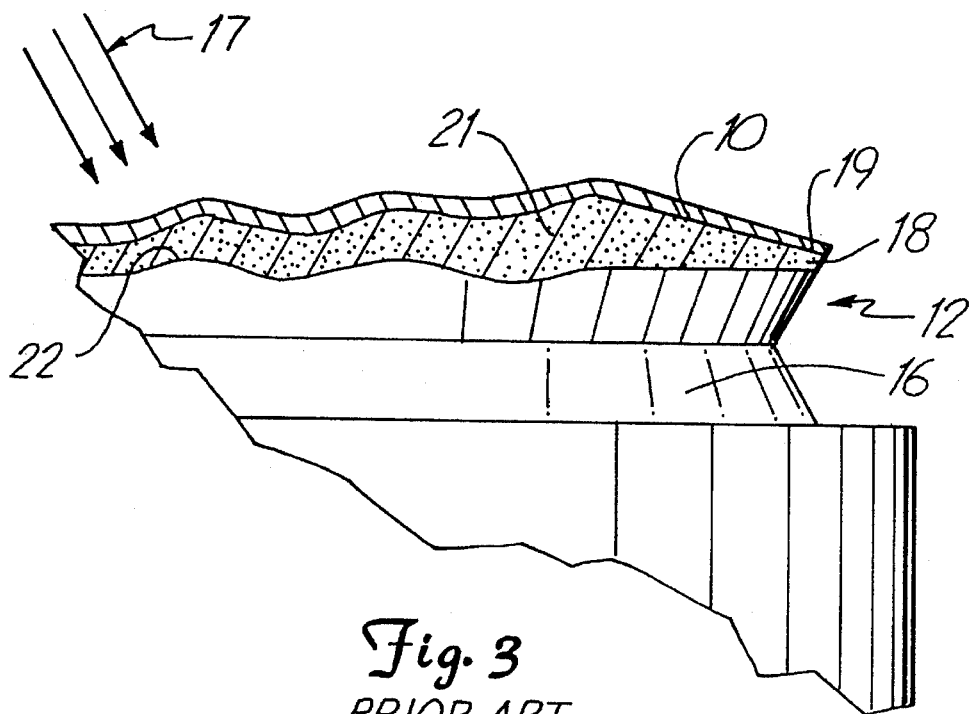
FIG. 3 is a partial sectional side view of a prior art remote seal isolator diaphragm assembly during application of a localized pressure gradient.

FIG. 3 schematically shows the prior art remote seal isolator assembly in cross section during application of a localized high intensity spray from a nozzle as denoted by arrows 17. Distortion of diaphragm 10 occurs as a result of displacement of the substantially incompressible isolator fill fluid disposed in cavity 21 between diaphragm 10 and surface 22 of support 16. Accordingly, such distortion of diaphragm 10 generates a primary diaphragm hinge line 19 near the attachment at 18 at the edge of diaphragm 10, and the diaphragm is highly stressed as the bulging fluid deforms diaphragm 10. The spray 17 pulses and is moved to different locations, resulting in fatigue loading of the diaphragm 10.

Figure 4:
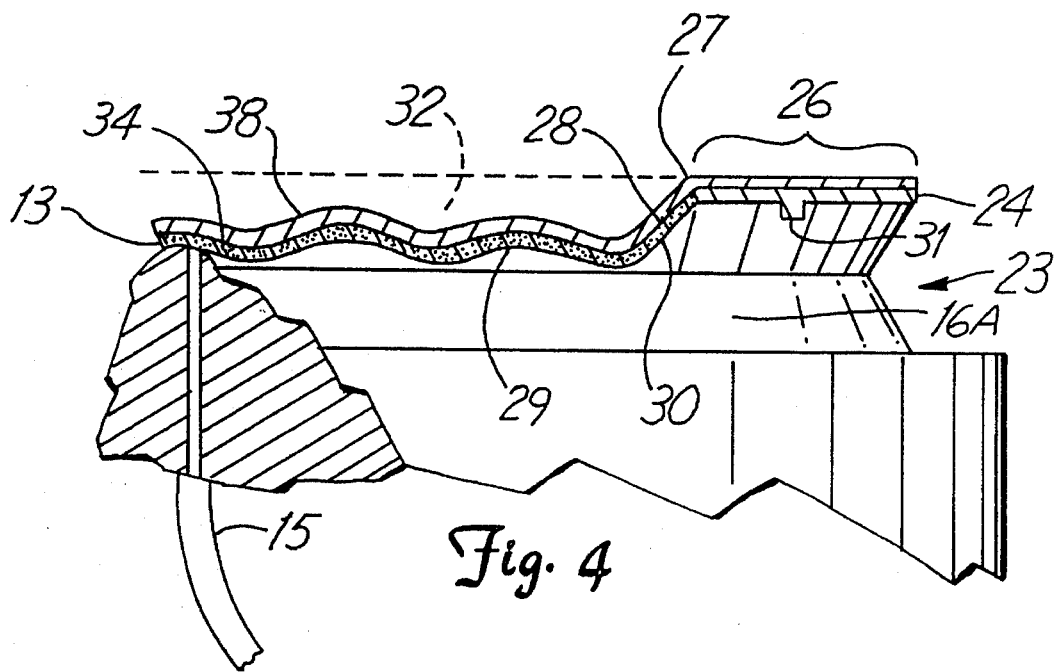
FIG. 4 is a partial sectional side view of the remote isolator assembly of the present invention.
Figure 5:
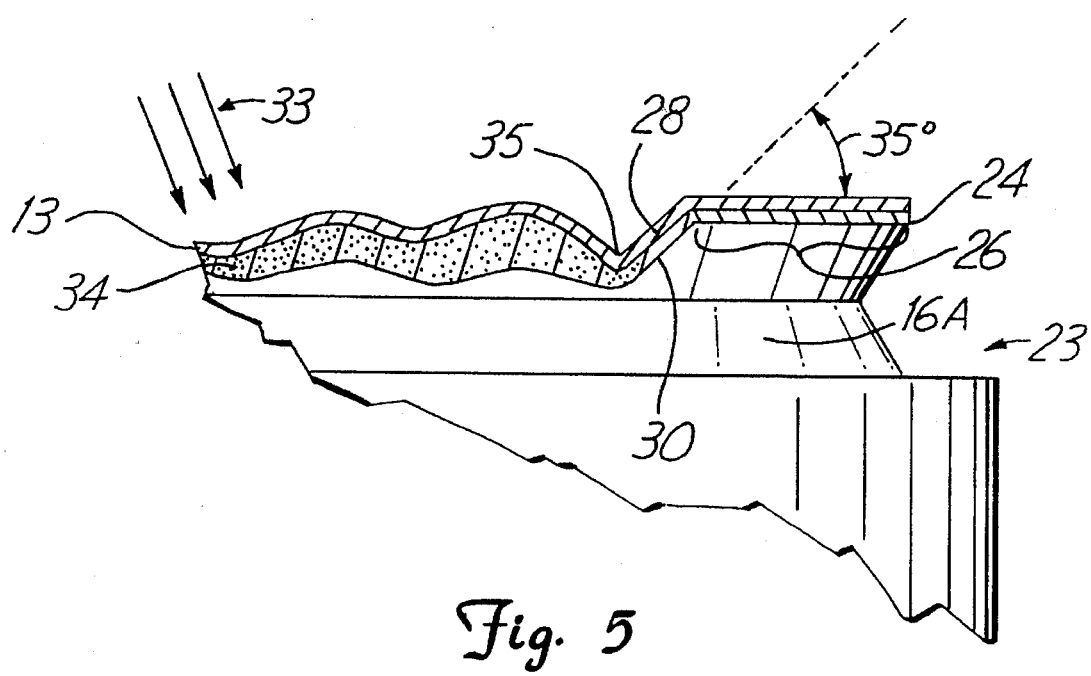
FIG. 5 is a partial sectional side view showing deformation of the isolator diaphragm of the present invention during application of localized stress.

FIG. 4 shows a remote seal assembly 23 made according to the present invention. Bonding media or material 24 secures a peripheral edge portion of flexible isolator diaphragm 13 to support member 16A over a relatively large annular bonding support surface 26 on the support member 16A. An interior edge 27 of support surface 26 joins an annular (part conical) inclined surface 30. Inclined surface 30 tapers downwardly to and joins a second central surface 29 of support 16A at a second elevation forming a bottom of a recess 32. The surface 29 is covered by diaphragm 13. Diaphragm 13 and the second surface 29 form an isolator chamber 34 filled with a desired quantity of non-compressible fluid. Diaphragm 13 includes an annular inclined wall section 28 similar in contour and shape to annular inclined surface 30 and a center, interior flexible portion 38 (exposed to the process media) integrally joined to the wall section 28. Surface 30, formed in support member 16A, is straight in cross section and preferably inclined at about 35° from a plane parallel to the support surface 26, as shown in FIG. 5. Stated another way, this part conical surface is formed at a cone angle of about 55° from a vertical axis of support surface 26.

In a preferred mode, bonding material 24 comprises a braze material to form a fluid-tight brazed bond between support surface 26 and the peripheral edge portion of the diaphragm 13. Annular groove 31 formed in support 16A and opening to support surface 26 receives preformed wire braze material prior to bonding the material as shown in dotted lines in FIG. 6. When the diaphragm 13 is placed over the surface 26 and the diaphragm and support 16A are heated, the braze material in groove 31 migrates from the groove 31 to bond surface 26 in the facing surface portion of diaphragm 13 to form a fluid-tight seal over substantially the entire area of bonding surface 26. The support 16A can be inverted during heating. The preferred braze material comprises an alloy of approximately 82% gold and 18% nickel preformed into wire form, but suitable braze alloys that exhibit a bonding temperature of less than 1000 degrees Celsius are acceptable for the present invention.

FIG. 5 illustrates the dynamics of the remote seal assembly 23 of the present invention during application of high pressure cleaning solutions (i.e., CIP system) denoted by arrows 33, which solutions usually are applied with a nozzle. Fluid under pressure shown by arrows 33 emitted from a nozzle generally impacts a portion of diaphragm 13 at an angle for cleaning sanitary surfaces and acts to tend to push the non-compressible fluid toward one side of the cavity 34. In the preferred mode, annular wall section 28 of diaphragm 13 defines an acute angle equal to the angle of wall 30 relative to the bonding support surface 26.

Figure 6:
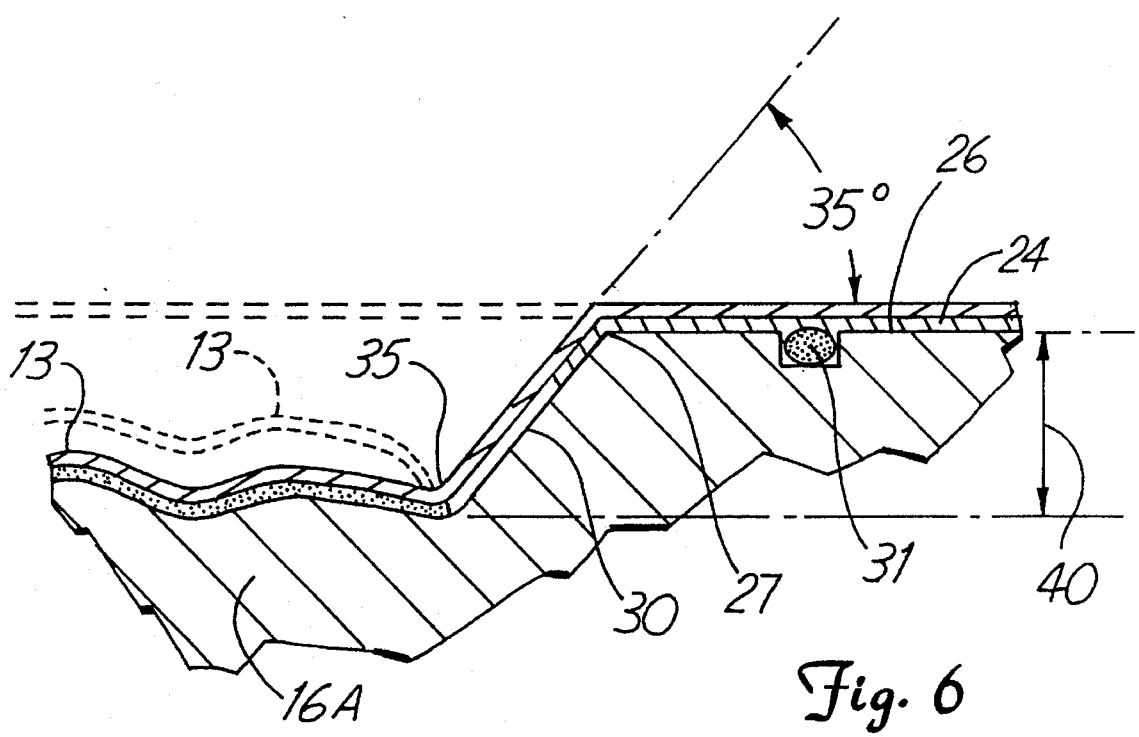
FIG. 6 is a further enlarged sectional side view of an edge portion of the remote isolator assembly of the present invention.

Also in the preferred mode, the surface 29 is recessed or offset approximately 0.030–0.050 inches relative to the substantially planar support surface 26, as shown by arrow 40 in FIG. 6. In the preferred mode, the primary diaphragm hinge line during deflection is along a line 35 at the junction of the lower edge of annular inclined wall section 28, and center interior wall 38, so that upon application of localized high pressure spray force as shown by arrows 33, diaphragm 13 will distort and essentially moves toward and into contact with surface 30 at the hinge region for diaphragm 13. The center interior portion 38 bulges up as shown in dotted lines in FIG. 6. The hinge line 35 for the center interior portion 38 is near the bottom of inclined wall section 28 and not at the perimeter of the diaphragm 13 nor at the inner edge 27 of bonding area 26. The diaphragm shifts or moves close to surface 30 near hinge line 35 and tends to restrict the space at the edge of wall 30 so the fluid in cavity 34 does not tend to flow up between surface 30 and diaphragm section 28. Thus, the substantially incompressible fill fluid in cavity 34 does not cause swelling and flexing of diaphragm 13 adjacent the bonding media 24. The stresses caused by the high pressure cleaning spray 33 is concentrated at the lower end of annular inclined surface 30 of support member 16A. The present invention is most useful in applications where CIP or manual cleaning systems are employed which result in substantially unequal pressure gradients moving across the exposed surface of the flexible diaphragm 13.

The preferred bonding method starts with the diaphragm member 13 being substantially planar so it extends along the plane of support surface 26 initially, so that during heating for brazing, the braze material flows or migrates between the surface 26 and the mating surface of the diaphragm 13, but stops at interior edge 27 due to the relatively large, abrupt opening formed by the inclined surface 30 of support 16A. Then, after the brazed assembly cools, pressure is exerted substantially normal to the surface of diaphragm 13 so that the diaphragm 13 is deformed against surface 29 of the recess 32 and closely approximates the configuration of surfaces 29 and 30 of support member 16A. Following the bonding step, the fluid-tight cavity 34 between support 16A and diaphragm 13 is charged with substantially incompressible fill fluid. The surface 29 and formed diaphragm 13 have annular corrugations, as shown.

Although the present invention has been described with referenced to preferred embodiments, workers skilled in the art will recognize that changes may be made in form and detail without departing from the spirit and scope of the invention. For example, the present invention provides equal utility in pancake, flange-mount, extended diaphragm, and threaded seal configurations, either remotely or closely coupled to a suitable pressure transmitter, as desired by a particular application.

What is claimed is:

1. A pressure sensitive remote isolator diaphragm assembly for use in sanitary processing applications where high intensity fluid cleaning systems are employed, comprising:

an isolator diaphragm support member having a planar outer periphery surface, a recessed interior surface portion with an annular inclined surface therebetween and an aperture formed in the recessed interior portion;

a thin flexible isolator diaphragm having an exposed surface capable of receiving a localized spray from a cleaning system, the exposed surface comprising a peripheral surface portion, a recessed flexible interior portion and an annular inclined section between the peripheral surface portion and the interior portion overlying the recessed interior surface portion of the support member, the recessed interior portion being positioned to receive the localized spray from a cleaning system to generate substantially unequal pressure gradients thereacross;

bonding means disposed between the peripheral surface portion and the planar outer periphery area for bonding the peripheral surface portion to the planar outer periphery area of the support member;

a tube connected to the aperture and leading to a pressure sensor and forming an enclosed fluid tight cavity between the diaphragm and the recessed interior surface portion in the recessed area of the support member; and a non-compressible fluid within the fluid-tight cavity, for communicating movement of the diaphragm through the tube to the connected pressure sensor.

2. The assembly of claim 1, wherein the annular inclined surface is straight in cross section.

3. The assembly of claim 2, wherein the annular inclined surface is inclined at an acute angle of 35 degrees relative to the planar outer periphery surface of the support member.

4. The assembly of claim 2, including substantially identical annular ridges formed in the recessed area of the support member and the recessed interior portion of the isolator diaphragm.

5. The assembly of claim 1, wherein the tube comprises capillary tubing.

6. The assembly of claim 1, wherein the interior portion of the isolator diaphragm is recessed between 0.030 and 0.050 inches from the periphery portion of the diaphragm.

7. A pressure responsive remote seal apparatus for use in sanitary processing of process media where clean-in-place pressure cleaning systems are employed, comprising:

a support member having an elevated planar annular area for supporting the diaphragm and a recessed area comprising a center surface offset from the planar annular area, and having an inclined surface between the annular area and the offset center surface;

a flexible diaphragm having an exposed surface capable of receiving a localized spray from a cleaning system, the exposed surface comprising a recessed interior surface area, an elevated annular planar periphery area and an inclined wall portion between the annular planar periphery area and the interior surface area to generally conform to the recessed area of the support member, the recessed interior surface area being positioned to receive the localized spray from a cleaning system to generate substantially unequal pressure gradients thereacross;

a bonding material for securing the support member elevated planar annular area to the diaphragm planar periphery area over substantially the entire surface of the elevated planar annular area of the support member to form a fluid-tight cavity between the diaphragm and the recessed center surface and inclined surface of the support member;

a non-compressible fluid disposed within the fluid-tight cavity for transmitting pressure changes caused by deflection of the flexible diaphragm, which fluid comprises a fluid material generally recognized as safe in the sanitary processing industry; and a sealed passageway for conducting the fluid therethrough to a pressure sensor during deflection of the recessed interior surface area of the diaphragm.

8. The assembly of claim 7, including the inclined surface formed at an angle such that forces on the diaphragm cause flexing of the diaphragm primarily at the junction between the inclined wall portion and the interior surface area of the diaphragm.

9. The assembly of claim 7, wherein the inclined surface and inclined wall portion are at an angle relative to the recessed interior surface, such that upon deflection of the diaphragm recessed interior surface area tending to urge the incompressible fluid toward the inclined surface, a junction between the recessed interior surface area and the inclined wall portion of the diaphragm is urged toward the inclined surface of the support member to restrict passage of fluid along the inclined surface toward the planar annular area.

* * * * *